Aug. 30, 1955  E. MOSER  2,716,403
MACHINE FOR MACHINING JEWELS
Filed Oct. 7, 1953  3 Sheets-Sheet 1
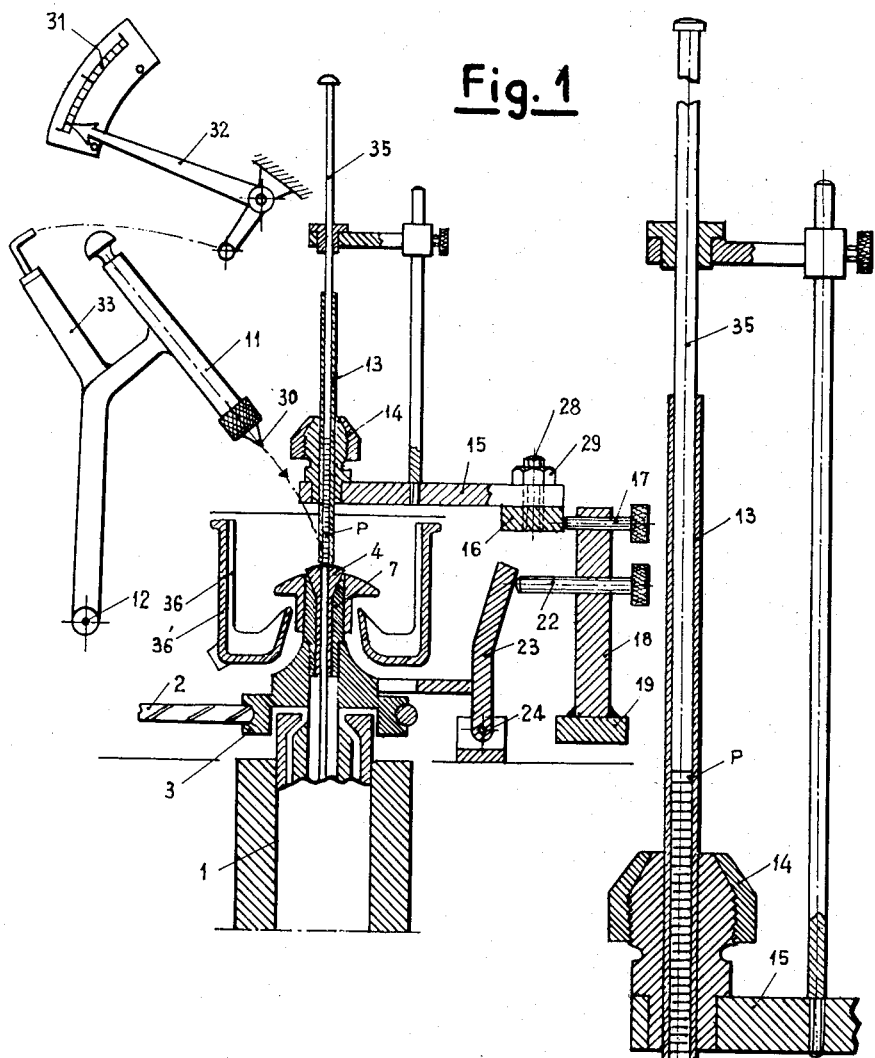
Fig. 1
Fig. 2
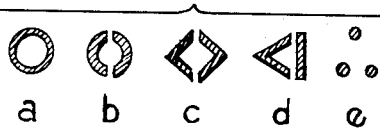
Fig. 3
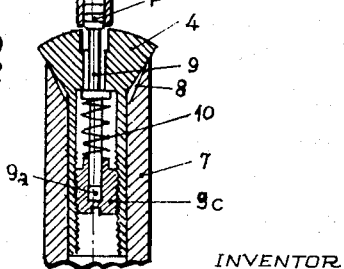
INVENTOR
Ernest Moser.
BY
ATTORNEY Aug. 30, 1955 E. MOSER 2,716,403
MACHINE FOR MACHINING JEWELS
Filed Oct. 7, 1953 3 Sheets-Sheet 2
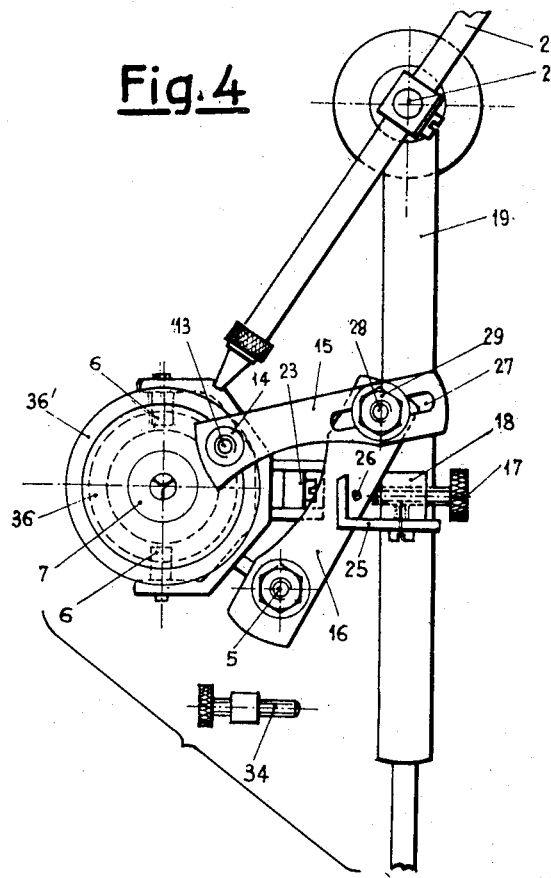
Fig. 4
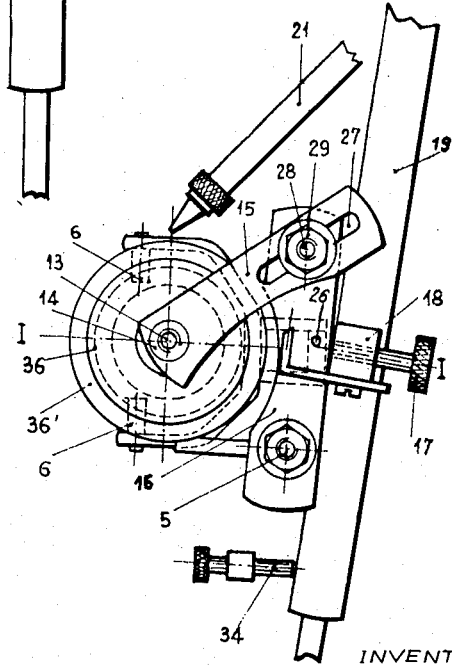
Fig. 5
INVENTOR
Ernest Moser.
BY 
ATTORNEY United States Patent Office 2,716,403
Patented Aug. 30, 1955

2,716,403

MACHINE FOR MACHINING JEWELS

Ernest Moser, Yverdon, Switzerland

Application October 7, 1953, Serial No. 384,678

Claims priority, application Switzerland October 11, 1952

4 Claims. (Cl. 125—30)

This invention relates to a machine for machining jewels.

Jewels for timepieces, meters, wheel trains and for any industrial employment are generally machined in several successive operations, each of them effected on a special machine. Because of the minute dimensions of the pieces to be machined, the operator must place each jewel in the machine, and, after completion of the operation, remove it therefrom. In a polishing machine, for instance, the operator must place each jewel on a plate of the machine with the aid of tweezers. This causes a relatively great loss of time. In machines for making cavities or hollows, the loss of time resulting from putting each jewel in place is even greater, because the jewel must be placed in a clasp secured to the end of a vertical or horizontal rotary spindle. In these machines, a spindle brake causes the clasps to open. The operator must then grasp the machined jewel with tweezers, and place another jewel to be machined into the clasp.

The present invention relates to a machine adapted to machine jewels, particularly to produce hollows, curves, bevel edges and grooves. The disadvantages mentioned above are eliminated owing to the fact that it comprises a feeder into which the jewels are placed contiguously, face to face, means being provided for ejecting the jewels one by one from the feeder.

The accompanying drawing shows, by way of example, two forms of construction of a machine adapted to machine jewels for timepieces.

Figure 1 is a diagrammatic view, partially in section, along line I—I of Fig. 5 of a semi-automatic machine for making cavities or hollows.

Figure 2 is a diagrammatic view, partially in section, of the feeder and of the clasp intended to grip the jewel to be machined.

Figure 3 shows, in transverse section, five different forms of construction of a tubular element forming the feeder.

Figure 4 is a partial plan view of the machine shown in Fig. 1, the feeder being in eclipsed position.

Figure 5 is a partial plan view, similar to that of Fig. 4, in which the feeder is shown in position for changing jewels.

Similar references designate corresponding parts throughout the several figures of the drawings.

Figure 6:
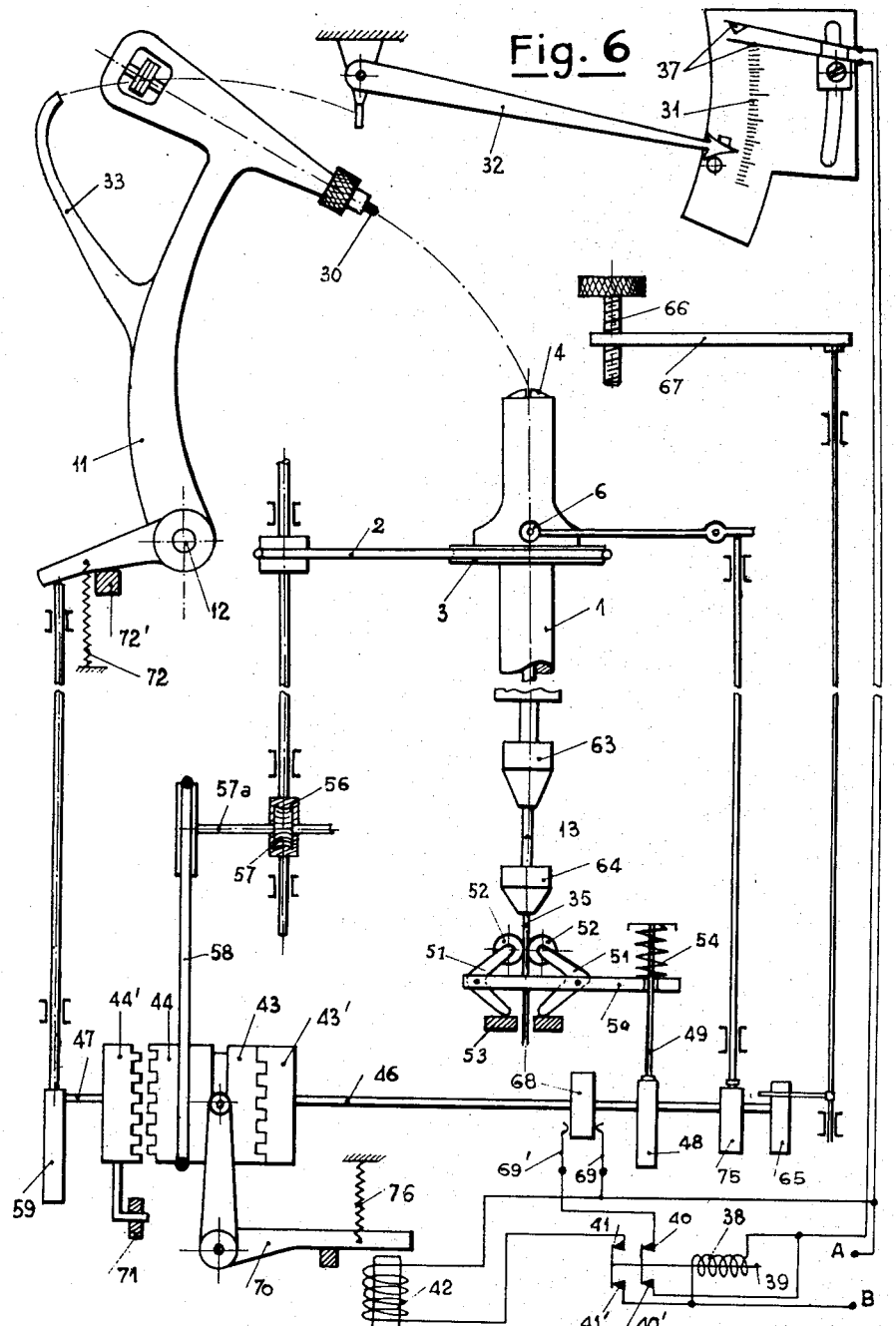
Figure 6 is a mechanical and electrical schematic diagram of a completely automatic machine.

According to Figures 1 to 5, the machine for making hollows or cavities in the jewels includes a semi-automatic feeding device. This machine has, after the fashion of known machines, a rotary spindle 1 driven in rotation by a belt 2 passing over a grooved pulley 3. Said spindle supports at its free end a clasp 4 with a conical seat adapted to receive the jewel to be machined. As in the known machines of this type, the opening of the claws of clasp 4 permitting withdrawal of the machined piece and replacement by another piece to be machined is brought about by the application of a brake 6 (Figs. 4 and 5) acting on the upper face of grooved pulley 3. This brake 6 first causes the spindle to stop, with the belt sliding on the grooved pulley. Then, with a push of greater force, the pulley slides axially, against the action of a spring (not shown), carrying a sleeve 7 with it in its movement. The displacement of sleeve 7 disengages clasp 4 from its conical seat in the end of sleeve 7, thus enabling the claws of the clasp 4 to yieldingly spread apart. The displacement of sleeve 7 thus disengages the machined jewel.

In the machine forming the subject matter of the invention and which is illustrated in Figs. 1 to 5, an ejector 9 (Fig. 2) provided in the center of the spindle and actuated by a spring 10 causes the ejection of the machined jewel from the jaws of the clasp.

Like known machines, the machine of the present invention comprises also a tool holder 11, at the end of which is a diamond point 30. This tool holder 11 rocks along a horizontal axis 12 so as to permit application of the diamond point to the jewel to be machined, and, upon completion of the hollow formed by said diamond point, retraction of the said tool so as to disengage the jewel-holding clasp 4 leaves the field entirely free for easy replacement of the jewel.

In addition to these elements, the machine illustrated in the drawing comprises also a feeder or magazine 13 secured by a clamp 14 to an arm 15 rigidly secured to the end of a lever 16 pivotally mounted at 5 (Fig. 4) on a fixed part of the machine. The angular movements of this lever 16 are controlled by a push rod 17 whose position is adjustable and which is mounted on a support 18 secured to an actuating or control member 19. This actuating member pivots on an axis 20 (Fig. 4), on which pivots also a duct 21 in communication with a source of lubricant (not shown). The nozzle end 21a of duct 21 directs a jet of lubricant on the piece being machined (Fig. 4).

Support 18 supports a second push rod 22 (Fig. 1) whose position is adjustable and which is intended to actuate the brake 6. The latter is formed by two shoes supported by a fork-shaped member rigidly secured to an arm 23 pivotally mounted on a horizontal axis 24. A hook 25 (Fig. 4) secured to the support 18 is adapted to be engaged by a pin 26 provided on arm 16.

The machine functions as follows:

Prior to operation, the feeder is filled with jewels to be machined. It is to be understood that the tubular element forming the feeder must correspond to the peripheral diameter of the jewels P to be machined (Fig. 2). The latter are arranged contiguously, face to face. The position of arm 16 is then adjusted in such a way that the path of the lower end of the feeder placed in clasp 14 passes exactly in the extension of the axis of rotation of the jewel-supporting spindle 1. To that end, a slot 27 is provided in arm 15. This slot engages a bolt 28 integral with lever 16. A nut 29 makes it possible to fix the exact position of arm 15 with respect to lever 16. Moreover, the feeder is adjusted in height so that its lower end passes over clasp 4 at a distance of some hundredths of a millimeter.

During the machining of the hollow or cavity, the control member 19 is in the position shown in Fig. 4—a position in which the brake is released and the feeder is in eclipsed position, so that the jewel-supporting spindle is driven in rotation by belt 2 and the diamond point 30 of the rocking tool 11 can manually be brought on the center of the jewel for machining the hollow.

The depth of the hollow can be verified, as in the known machines, by means of a graduated scale 31 in front of which moves a pointer 32 actuated by an arm 33 integral with spindle 11. When the hollow has reached the desired depth, the diamond point is retracted by rocking the spindle 11 in the opposite direction. The control member 19 is then actuated clockwise. Push rod 22 actuates arm 23 which rocks and applies the brake shoes 6 to the upper face of pulley 3. A sufficient pushing motion imparted to control member 19 results in an axial displacement of the said pulley downward. In this displacement the pulley carries sleeve 7 with it, thus releasing clasp 4 whose claws spread apart. Simultaneously, ejector 9 is raised by its spring 10 and pushes the machined jewel outside clasp 4. At that moment, spindle 1 has already been immobilized by the action of brake 6.

Push rod 17 is adjusted in such a way that the end of feeder 13 will reach the center of the spindle only when the machined jewel on the end of the ejector emerges from the open clasp. Because of this adjustment and because of the fact that the end of the feeder is at a very short distance from the spindle, the feeder arriving over the spindle pushes the machined jewel aside. An adjustable stop 34 limits the displacement of the control member 19 so as to stop it when the axis of the feeder is positioned exactly in the extensions of the axis of the spindle (Fig. 5).

An axial thrust exerted on push rod 35, formed by a stem with a diameter corresponding to that of the jewels and engaged in the hollow interior of the feeder, causes a displacement of the jewels P with respect to the feeder. The lower jewel leaves the feeder and comes to rest on the end of ejector 9. By exerting a sufficient thrust on push rod 35, the ejector is pushed back against the action of its spring 10, so that the lowermost jewel is engaged between the claws of clasp 4. The displacement of push rod 35 is limited by the lower end of the ejector coming into contact with the bottom of its housing 9a in nut 9c whose axial position is adjustable.

Reverse actuation of the control member, in other words, anti-clockwise, causes first an ascending movement of sleeve 7 and of pulley 3. This axial displacement of the sleeve causes the clasp to grip the jewel resting on the end of the ejector. The thrust of push rod 35 must not be sustained until the clasp closes. In fact, the friction of the jewels in the feeder prevents any displacement of the ejector 9 under the action of its spring 10. Then, with the jewel firmly gripped in the clasp, the brake is released and the spindle again driven in rotation. The feeder 13 is then brought back into the eclipsed position (Fig. 4) by means of hook 25 and pin 26.

Inasmuch as duct 21 is integral with the control member 19, it follows all of the latter's angular displacements. The machined jewel pushed on the edge of clasp 4 by the feeder is projected as soon as the said clasp is rotated by centrifugal force, on the one hand, and by the jet of lubricant, on the other hand, and then drops into a very fine removable screen basket 36. This basket is situated in an annular support 36' rigidly secured on a base plate (not shown) on which all elements of the machine are mounted.

It should be noted that in another form of construction, the feeder 13, instead of being movable, could be stationary, and the jewel-supporting spindle could be movable and adapted to occupy at least two positions, one for feeding jewels, the other for working on the jewel which the spindle supports.

Figure 3 shows, in transverse section and by way of example, five modifications of the construction of the tubular element forming the feeder. This element could be formed either according to variation (a) by a cylindrical tube of circular cross section, or according to variation (b) by two semi-circular sections, or by a V-shaped section with the open end of the V facing a flat strip (variation d), or by two V-shaped sections opposite each other (variation c), or else by three stems disposed in the shape of a triangle (variation e).

Figure 6 shows, diagrammatically and by way of example, a machine of the same type as that described hereinabove, in which the change of jewels takes place entirely automatically, as does the control of the movements of the rocking spindle 11 supporting the diamond point 30. In this form of construction, after the depth desired to the hollow has been reached, pointer 32 closes contacts 37 whose position is adjustable. One of these contacts is electrically connected to a source of electric current (not shown) through terminals A and B; the other to one of the ends of a winding 38 of an electromagnetic relay 39. The other end of winding 38 is connected to the source. This relay comprises two circuit closing contacts 40, 40' and 41, 41'. Contact 40, 40' is a contact for delivering current to the winding 38, whereas contact 41, 41' is inserted in the feeder circuit of an electromagnet 42. The latter controls the engaging and disengaging movements of two clutches 43, 43', 44, 44', forming a double dog coupling. The driving parts 43, 44 are rigidly secured to each other and mounted loosely on their shaft, whereas the driven parts 43', 44' are rigidly mounted on shafts 46 and 47, respectively. Shaft 46 supports a cam 48 for controlling push rod 35 by means of a rod 49 which displaces a friction-type driving system. This system is formed by a support 50 on which are pivotally mounted two elbow-shaped levers 51 supporting at one of their ends rollers 52, preferably made of rubber, which grip push rod 35 by adhesion. The other end of the elbow-shaped levers 51 bears, in the position of rest (position illustrated in Fig. 6), against a stop 53.

A cam 75 controls the movements of brake 6. The driven part 43, 44 of the double clutch is driven in rotation by a main shaft 55 of the machine by means of an endless screw or worm 56, a crown 57 secured to a shaft 57a, and a driving belt 58. Shaft 47 supports a cam 59 for controlling the movements of the rocking spindle support 11 through the intermediary of a push rod 60.

In this machine, feeder 13 is positioned within the spindle 1. Ejector 9 has been eliminated. It is obvious that spindle 1 rests in bearings (not shown) provided in the base plate (not shown) of the machine. The axial position of this spindle is determined by stops (not shown). The feeder is held in position by a clasp 63 secured to the lower end of spindle 1. The lower end of feeder 13 supports a clasp 64, intended to prevent any unwarranted axial sliding of push rod 35.

A cam 65 mounted on shaft 46 controls the angular displacements of a stop 66 whose position is adjustable and which is supported by an arm 67, as well as the angular displacements of duct 21 (not shown). Finally, shaft 46 supports also a rotary circuit breaker or switch formed by a disc 68 of insulating material provided on each of its faces with a ring (not shown). These rings are electrically connected with each other. Brushes 69, 69', connected in series with the feeder circuit of winding 38, brush against these rings which are not closed but have an interruption of sufficient width to prevent, for a given angular position of disc 68, any contact between the rings and the brushes.

This machine operates as follows:

When the hollow has reached the desired depth, pointer 32 actuated by arm 33 causes the closing of contacts 37 so that relay 39 is activated.

The latter closes the circuit of electromagnet 42 through B, 41', 41, 42, A and through B, 38, 40', 40, 69', 69, A.

Activation of electromagnet 42 causes the attraction of an armature 70 which controls the axial displacement toward the right of the driving part 43, 44 and the latter's engagement with the driven part 43'; hence, the driving in rotation of shaft 46. Inasmuch as shaft 47 is no longer driven, it returns to its initial angular position, determined by a stop 71, under the influence of a spring (not shown). The rocking spindle 11 returns to a resting stop 72' under the influence of a spring 72. Pointer 32 likewise resumes its position of rest so that contacts 37 are opened. Winding 38 remains activated, however, because shaft 46 having then completed, by a certain angle of rotation, brushes 69, 69' are electrically connected through the rings mounted on disc 68. Shaft 46 thus continues its rotation and cam 65 then controls the displacement of stop 66 into a position in the extension of the axis of the spindle. Its height is adjusted in such a way as to allow for a very slight play between the stop and the end of clasp 4. Cam 75 then actuates brake 6. The latter's push causes the axial displacement of pulley 3 and of sleeve 7 and thus the opening of clasp 4. Push rod 35 is then actuated by cam 48 controlling the friction-type driving mechanism 50—52 by means of a spring 54. Rollers 52 grip the push rod and drive it upward. The movement of the push rod is limited by the fact that the uppermost jewel comes into contact with stop 66. From then on, the rollers 52 slide along push rod 35 and spring 54 absorbs the supplementary stroke controlled by cam 48.

Upon completion of all these movements, cam 75 gradually releases the brake so that clasp 4 closes again on the jewel to be machined, engaged between its claws. Cam 65 controls the return of stop 66 into its eclipsed position. As soon as this stop 66 has been separated from the spindle, the completed jewel engaged at the end of the spindle is released and ejected, either by the jet of lubricant coming from duct 21 or else by the centrifugal force, whereupon it drops into the basket 36 (not shown). Cam 48 allows the driving system to return to its resting stop 53. Because of the disposition and shape of levers 51, the rollers 52 cannot grip push rod 35 during this return movement, and when the arms 51 rest on their stops 53, the rollers are automatically separated from push rod 35 under the action of the system's weight.

Finally, after shaft 46 has described a complete revolution, circuit breaker 68 cuts off the feeder circuit of relay 39. The latter, under the influence of a spring (not shown), returns to its position of rest and opens contacts 40, 40' and 41, 41'. The opening of 41, 41' causes the opening of the feeder circuit of the electromagnet 42 and the axial displacement of the driving part 43, 44 under the influence of a spring 76 and the engagement of the driving parts 44 with the driven part 44'. Shaft 47 is again driven in rotation, and cam 59 controls then the rocking motion of the spindle support 11.

It is to be noted that inasmuch as the main shaft 55 rotates very rapidly in order to drive the jewel-supporting spindle at a very high rate of speed, the said shaft drives the driving part of the double clutch through the intermediary of a speed reducing gear whose ratio is calculated in such a way that the control of the rocking motion of spindle 11 is effected in the course of a single revolution of shaft 47. In other words, for a revolution of the latter of at least 360°. Similarly, the control of the changing of jewels is effected in the course of a single complete revolution of shaft 46. In order to shorten the time necessary for changing jewels, a speed step-up gear could be provided between the driven part 43' and shaft 46.

It is obvious that the control mechanisms of the various movements necessary for changing jewels could be different from those described and shown in the drawing. They could be designed to meet the requirements of each case and could be adapted to different types of machines. For instance, as in the case of the machine described with reference to Figures 1 to 4, feeder 13 could be positioned above the spindle, even though the form of execution described is easier to construct. It is clear that for proper operation of the friction-type driving mechanism, a guiding element must be provided for its support 50. Such a guiding element has not been shown, either, for the sake of clarity.

In practice, several machines could be mounted on the same base plate—for instance, 10 or 15—all of them driven by the same main shaft 55. This main shaft actuates each rotary spindle by means of a belt, on the one hand, and through the intermediary of a speed reducing gear, a shaft 57a common to all the machines, on the other hand. This shaft 57a in turn drives the cam shafts of each individual machine by means of gears or belts.

Finally, the feeder described can be mounted on any machine intended to work on jewels such as jewels for timepieces, wheel trains and jewels or stones for all types of industrial uses. In the case of a polishing machine, for instance, the feeder could be mounted on a pivoting arm thus making it possible to place one jewel after another on the face plate of the polishing machine.

It is advisable that the interior of the tubular element in which the jewels are pushed be slightly lubricated but not enough to permit the jewel situated at its end from voluntarily sliding out of the tube.

I claim:

1. An apparatus for machining fine jewels comprising, in combination, a rotary spindle, a jewel clasp mounted on the end portion of said spindle, a spring-actuated jewel ejector mounted in and in cooperating relationship with said clasp, a tubular magazine means for feeding jewels contained therein to said clasp, said means being operatively positioned with regards to said clasp, a pusher rod means in said magazine means for displacing jewels in said magazine means toward the exit thereof into said clasp, a support movable with regard to said rotary spindle, a toolholder mounted on said support and movable with regard to said rotary spindle, a tool in said toolholder, means operatively connected with said toolholder for controlling the machining of a jewel in said clasp by the tool in said toolholder, and a means for controlling simultaneously, at the end of the machining operation, the stopping of the rotation of the spindle, the releasing of the machined jewel from the clasp, and the ejection of the machined jewel by the ejector.

2. An apparatus for machining fine jewels comprising, in combination, a rotary spindle, a jewel clasp mounted on the end portion of said spindle, a sleeve positioned around said clasp, said sleeve being axially movable with regards to said clasp, a pulley member positioned around at least a portion of said sleeve and integral therewith, a pulley braking member operatively connected with said pulley member, a spring-actuated jewel ejector mounted in and in cooperating relationship with said clasp, a tubular magazine means for feeding jewels contained therein to said clasp, said means being operatively positioned with regards to said clasp, a pusher rod means in said magazine means for displacing jewels in said magazine means toward the exit thereof into said clasp, a support movable with regards to said rotary spindle, a toolholder mounted on said support and movable with regards to said rotary spindle, a tool in said toolholder, means operatively connected with said toolholder for controlling the machining of a jewel held in said clasp by said tool, and a means for controlling simultaneously at the end of the machining operation the stopping of the rotation of the spindle by actuating said braking means, the releasing of the machined jewel from the clasp, and the ejection of the machined jewel by the ejector.

3. The apparatus of claim 1 including a pivoted support operatively connected to said magazine means and to said control means, whereby a displacement of said magazine means relative to said spindle is brought about upon the introduction of a new jewel to be machined into the clasp.

4. Apparatus for machining fine jewels comprising, in combination, a rotary spindle, a jewel clasp mounted at the end portion of said spindle, a tubular magazine means for feeding jewels contained therein to said clasp, said means being positioned within said rotary spindle, a pusher rod means in said magazine means for displacing jewels in said magazine means toward the exit thereof into said clasp, a support movable with regards to said spindle, a toolholder mounted on said support and movable with regards to said spindle, a tool in said toolholder, means operatively connected with said toolholder for controlling the machining of a jewel in said clasp by said tool, and electrically controlled mechanical means for controlling automatically the placing of the jewels to be machined in the clasp, the opening and closing of the clasp, the ejection of the machined jewel, and movement of the toolholder and its tool.

References Cited in the file of this patent

UNITED STATES PATENTS

| | | |
|---|---|---|
| 1,302,907 | Gabus | May 6, 1919 |
| 1,343,042 | Dusha et al. | June 8, 1920 |
| 1,465,446 | Lombardi | Aug. 21, 1923 |
| 2,193,128 | Gammeter | Mar. 12, 1940 |
| 2,241,351 | Indge et al. | May 6, 1941 |
| 2,351,134 | Koulish | June 13, 1944 |
| 2,435,142 | Kovacs | Jan. 27, 1948 |